United States Patent
Zhao et al.

(10) Patent No.: US 11,711,581 B2
(45) Date of Patent: Jul. 25, 2023

(54) MULTIMODAL SEQUENTIAL RECOMMENDATION WITH WINDOW CO-ATTENTION

(71) Applicant: Adobe Inc., San Jose, CA (US)

(72) Inventors: Handong Zhao, San Jose, CA (US); Zhankui He, San Diego, CA (US); Zhe Lin, Bellevue, WA (US); Zhaowen Wang, San Jose, CA (US); Ajinkya Gorakhnath Kale, San Jose, CA (US)

(73) Assignee: Adobe Inc., San Jose, CA (US)

( * ) Notice: Subject to any disclaimer, the term of this patent is extended or adjusted under 35 U.S.C. 154(b) by 99 days.

(21) Appl. No.: 17/200,691

(22) Filed: Mar. 12, 2021

(65) Prior Publication Data

US 2022/0295149 A1 Sep. 15, 2022

(51) Int. Cl.
*G06Q 30/00* (2023.01)
*H04N 21/466* (2011.01)
(Continued)

(52) U.S. Cl.
CPC ........... *H04N 21/4666* (2013.01); *G06N 3/08* (2013.01); *G06Q 30/0282* (2013.01);
(Continued)

(58) Field of Classification Search
CPC ......... G06Q 30/06–08; G06Q 30/0282; G06Q 30/0631; H04N 21/4666; H04N 21/4532;
(Continued)

(56) References Cited

U.S. PATENT DOCUMENTS 8,095,521 B2 * 1/2012 Chan ..................... G06Q 30/02
   707/705
11,042,898 B2 * 6/2021 Mehanian .......... G06Q 30/0246
(Continued)

OTHER PUBLICATIONS

Wang, Zhaowen et al., "Vista: A Visually, Socially, and Temporally-aware Model for Artistic Recommendation," ACM, ISBN #20164202918938, Dialog 8pgs; (Year: 2016).*
(Continued)

*Primary Examiner* — Robert M Pond
(74) *Attorney, Agent, or Firm* — FIG. 1 Patents (57) ABSTRACT

A multimodal recommendation identification system analyzes data describing a sequence of past content item interactions to generate a recommendation for a content item for a user. An indication of the recommended content item is provided to a website hosting system or recommendation system so that the recommended content item is displayed or otherwise presented to the user. The multimodal recommendation identification system identifies a content item to recommend to the user by generating an encoding that encodes identifiers of the sequence of content items the user has interacted with and generating encodings that encode multimodal information for content items in the sequence of content items the user has interacted with. An aggregated information encoding for a user based on these encodings and a system analyzes the content item sequence encoding and interaction between the content item sequence encoding and the multiple modality encodings to generate the aggregated information encoding.

20 Claims, 5 Drawing Sheets

(51) Int. Cl.
  *G06N 3/08* (2023.01)
  *H04N 21/45* (2011.01)
  *H04N 21/4722* (2011.01)
  *G06Q 30/0282* (2023.01)
  *G06Q 30/0601* (2023.01)

(52) U.S. Cl.
  CPC ..... *G06Q 30/0631* (2013.01); *H04N 21/4532* (2013.01); *H04N 21/4667* (2013.01); *H04N 21/4722* (2013.01)

(58) Field of Classification Search
  CPC ... H04N 21/4667; H04N 21/4722; G06N 3/08
  See application file for complete search history.

(56) References Cited

U.S. PATENT DOCUMENTS

| | | | | |
|---|---|---|---|---|
| 2008/0243637 | A1* | 10/2008 | Chan | G06Q 30/02 705/26.1 |
| 2013/0198030 | A1* | 8/2013 | Linden | G06Q 30/0256 705/26.7 |
| 2019/0362220 | A1* | 11/2019 | Yap | G06N 3/045 |
| 2022/0058714 | A1* | 2/2022 | Chen | G06N 3/048 |

OTHER PUBLICATIONS

Chen, Xusong et al., "BERT4SessRec: Content-Based Video Relevance Prediction with Bidirectional Encoder Representations from Transformer", MM '19: Proceedings of the 27th ACM International Conference on Multimedia [May 4, 2021]. Retrieved from the Internet <https://doi.org/10.1145/3343031.3356051>., Oct. 2019, 5 pages.

Cho, Jaemin et al., "X-LXMERT: Paint, Caption and Answer Questions with Multi-Modal Transformers", arXiv Preprint, arXiv. org [retrieved Mar. 12, 2021]. Retrieved from the Internet <https://arxiv.org/pdf/2009.11278.pdf>., Sep. 23, 2020, 21 pages.

Devlin, Jacob et al., "BERT: Pre-Training of Deep Bidirectional Transformers for Language Understanding", arXiv.org [retrieved on Aug. 10, 2020]. Retrieved from the Internet <https://arxiv.org/abs/1810.04805v2>., May 24, 2019, 16 pages.

Fischer, Elisabeth et al., "Integrating Keywords into BERT4Rec for Sequential Recommendation", German Conference on Artificial Intelligence (Künstliche Intelligenz). Springer, Cham, [retrieved Mar. 29, 2021]. Retrieved from the Internet <https://doi.org/10.1007/978-3-030-58285-2_23>., Sep. 9, 2020, 8 pages.

Gao, Junyu et al., "A Unified Personalized Video Recommendation via Dynamic Recurrent Neural Networks", MM '17: Proceedings of the 25th ACM international conference on Multimedia [retrieved Mar. 29, 2021]. Retrieved from the Internet <http://nlpr-web.ia.ac.cn/mmc/homepage/jygao/JY_Gao_files/Conference_Papers/MM2017.pdf>., Oct. 2017, 9 pages.

He, Kaiming et al., "Deep Residual Learning for Image Recognition", Proceedings of the IEEE conference on computer vision and pattern recognition, 2016 [retrieved on Nov. 24, 2020], Retrieved from the Internet: <https://openaccess.thecvf.com/content_cvpr_2016/papers/He_Deep_Residual_Learning_CVPR_2016_paper.pdf>., Jun. 2016, 9 pages.

He, Ruining et al., "Fusing Similarity Models with Markov Chains for Sparse Sequential Recommendation", arXiv Preprint, Cornell University, arXiv.org [retrieved Apr. 6, 2021]. Retrieved from the Internet <https://arxiv.org/pdf/1609.09152.pdf>., Sep. 28, 2016, 10 pages.

He, Ruining et al., "Translation-based Recommendation", RecSys '17: Proceedings of the Eleventh ACM Conference on Recommender Systems [retrieved Mar. 29, 2021]. Retrieved from the Internet <https://cseweb.ucsd.edu/~jmcauley/pdfs/recsys17.pdf>., Aug. 2017, 9 pages.

Hendrycks, Dan et al., "Gaussian Error Linear Units (GELUs)", arXiv Preprint, Cornell University, arXiv.org [retrieved Apr. 6, 2021]. Retrieved from the Internet <https://arxiv.org/pdf/1606.08415.pdf>., Jul. 8, 2020, 9 pages.

Hidasi, Balazs et al., "Parallel Recurrent Neural Network Architectures for Feature-rich Session-based Recommendations", RecSys '16: Proceedings of the 10th ACM Conference on Recommender Systems [retrieved Apr. 19, 2021]. Retrieved from the Internet <http://www.hidasi.eu/content/p_rnn_recsys16.pdf>., Sep. 2016, 8 pages.

Hidasi, Balazs et al., "Session-based Recommendations with Recurrent Neural Networks", arXiv Preprint, Cornell University, arXiv.org [retrieved Apr. 19, 2021]. Retrieved from the Internet <https://arxiv.org/pdf/1511.06939.pdf>., Mar. 29, 2016, 10 pages.

Hidasi, Balázs et al., "Recurrent Neural Networks with Top-k Gains for Session-based Recommendations", CIKM '18: Proceedings of the 27th ACM International Conference on Information and Knowledge Management [retrieved Apr. 6, 2021]. Retrieved from the Internet <https://arxiv.org/pdf/1706.03847.pdf>., Aug. 28, 2018, 10 pages.

Huang, Xiaowen et al., "CSAN: Contextual Self-Attention Network for User Sequential Recommendation", MM '18: Proceedings of the 26th ACM international conference on Multimedia [retrieved Apr. 19, 2021]. Retrieved from the Internet <https://dl.acm.org/doi/pdf/10.1145/3240508.3240609>., Oct. 2018, 9 pages.

Kang, Wang-Cheng et al., "Self-Attentive Sequential Recommendation", 2018 IEEE International Conference on Data Mining (ICDM) [retrieved Apr. 19, 2021]. Retrieved from the Internet <http://cseweb.ucsd.edu/~jmcauley/pdfs/icdm18.pdf>., Nov. 2018, 10 pages.

Krichene, Walid et al., "On Sampled Metrics for Item Recommendation", KDD '20: Proceedings of the 26th ACM SIGKDD International Conference on Knowledge Discovery & Data Mining [retrieved Apr. 19, 2021]. Retrieved from the Internet <http://walid.krichene.net/papers/KDD-sampled-metrics.pdf>., Aug. 2020, 10 pages.

Lei Ba, Jimmy et al., "Layer Normalization", arXiv Preprint, arXiv.org [retrieved Mar. 12, 2021]. Retrieved from the Internet <https://arxiv.org/pdf/1607.06450.pdf>., Jul. 21, 2016, 14 pages.

Liu, Yinhan et al., "RoBERTa: A Robustly Optimized BERT Pretraining Approach", arXiv Preprint, Cornell University, arXiv.org [retrieved Apr. 19, 2021]. Retrieved from the Internet <https://arxiv.org/pdf/1907.11692.pdf>., Jul. 26, 2019, 13 pages.

Lu, Jiasen et al., "ViLBERT: Pretraining Task-Agnostic Visiolinguistic Representations for Vision-and-Language Tasks", arXiv Preprint, Cornell University, arXiv.org [retrieved Apr. 5, 2021]. Retrieved from the Internet <https://arxiv.org/pdf/1908.02265.pdf>., Aug. 6, 2019, 11 pages.

Mcauley, Julian et al., "Image-based Recommendations on Styles and Substitutes", SIGIR '15: Proceedings of the 38th International ACM SIGIR Conference on Research and Development in Information Retrieval [retrieved Apr. 19, 2021]. Retrieved from the Internet, <http://citeseerx.ist.psu.edu/viewdoc/download?doi=10.1.1.700.743&rep=rep1&type=pdf>., Aug. 2015, 10 pages.

Pagliardini, Matteo et al., "Unsupervised Learning of Sentence Embeddings using Compositional n-Gram Features", arXiv Preprint, Cornell University, arXiv.org [retrieved Apr. 19, 2021]. Retrieved from the Internet <https://arxiv.org/pdf/1703.02507.pdf>., Mar. 7, 2017, 13 pages.

Rendle, Steffen et al., "BPR: Bayesian Personalized Ranking from Implicit Feedback", arXiv Preprint, Cornell University, arXiv.org [retrieved Apr. 19, 2021]. Retrieved from the Internet <https://arxiv.org/ftp/arxiv/papers/1205/1205.2618.pdf>., May 9, 2012, 10 pages.

Rendle, Steffen et al., "Factorizing Personalized Markov Chains for Next-Basket Recommendation", WWW '10: Proceedings of the 19th international conference on World wide web [retrieved Apr. 19, 2021]. Retrieved from the Internet <http://www.ra.ethz.ch/cdstore/www2010/www/p811.pdf>., Apr. 2010, 10 pages.

Srivastava, Nitish et al., "Dropout: A Simple Way to Prevent Neural Networks from Overfitting", The Journal of Machine Learning Research, vol. 15, No. 1 [retrieved from the Internet <https://www.jmlr.org/papers/volume15/srivastava14a/srivastava14a.pdf?utm_campaign=buffer&utm_content=buffer79b43&utm_medium=social&utm_source=twitter.com>., Jan. 2014, pp. 1929-1958.

(56) References Cited

OTHER PUBLICATIONS

Sun, Fei et al., "BERT4Rec: Sequential Recommendation with Bidirectional Encoder Representations from Transformer", arXiv Preprint, arXiv.org [retrieved Apr. 5, 2021]. Retrieved from the Internet <https://arxiv.org/pdf/1904.06690.pdf>., Aug. 21, 2019, 11 pages.

Tan, Hao et al., "LXMERT: Learning Cross-Modality Encoder Representations from Transformers", arXiv Preprint, Cornell University, arXiv.org [retrieved Apr. 27, 2021]. Retrieved from the Internet <https://arxiv.org/pdf/1908.07490.pdf>., Aug. 20, 2019, 14 pages.

Tang, Jiaxi et al., "Personalized Top-N Sequential Recommendation via Convolutional Sequence Embedding", WSDM '18: Proceedings of the Eleventh ACM International Conference on Web Search and Data Mining [retrieved Apr. 27, 2021], Retrieved from the Internet <https://doi.org/10.1145/3159652.3159656>., Feb. 2018, 9 pages.

Vaswani, Ashish et al., "Attention Is All You Need", arXiv Preprint, Cornell University, arXiv.org [retrieved Apr. 27, 2021], Retrieved from the Internet <https://arxiv.org/pdf/1706.03762.pdf>., Dec. 6, 2017, 15 pages.

Wu, Liwei et al., "SSE-PT: Sequential Recommendation Via Personalized Transformer", RecSys '20: Fourteenth ACM Conference on Recommender Systems [retrieved Apr. 27, 2021]. Retrieved from the Internet <https://dl.acm.org/doi/pdf/10.1145/3383313.3412258>., Sep. 2020, 10 pages.

Wu, Liwei et al., "Stochastic Shared Embeddings: Data-driven Regularization of Embedding Layers", arXiv Preprint, Cornell University, arXiv.org [retrieved Apr. 27, 2021]. Retrieved from the Internet <https://arxiv.org/pdf/1905.10630.pdf>., May 25, 2019, 15 pages.

Zhang, Tingting et al., "Feature-level Deeper Self-Attention Network for Sequential Recommendation", Proceedings of the Twenty-Eighth International Joint Conference on Artificial Intelligence (IJCAI-19) [retrieved Apr. 27, 2021]. Retrieved from the Internet <https://www.ijcai.org/Proceedings/2019/0600.pdf>., Aug. 2019, 7 pages.

\* cited by examiner

MULTIMODAL SEQUENTIAL RECOMMENDATION WITH WINDOW CO-ATTENTION

BACKGROUND

As computing technology has advanced so too have the uses for computing devices. One such use is the consumption of content items by users, such as viewing digital content, listening to digital content, and so forth. Different systems attempt to identify content to recommend to users in different manners. For example, some conventional recommendation systems encode information associated with sequences of content items as additional content item features in an early fusion fashion, and other conventional recommendation systems model content item identifier sequences and additional information sequences as independent branches for late fusion.

The performance of these conventional systems, however, is limited because they employ simple fusion strategies that ignore the relationships between item and other information sequence dynamics, resulting in recommendations that are of limited value. Such situations leave users dissatisfied with the recommendations they receive, and recommendation providers dissatisfied with their systems' abilities to generate valuable recommendations for the users.

SUMMARY

To mitigate the drawbacks of conventional resource management solutions, a multimodal recommendation identification system as implemented by a computing device is described to provide multimodal sequential recommendation with window co-attention. A content item sequence encoding that encodes content item identifiers of a sequence of content items a user has interacted with is generated. Multiple modality encodings, each encoding modality information for one of multiple modalities for the content items in the content item sequence, are also generated. An aggregated information encoding for the sequence of content items and the modality information is created by a machine learning system analyzing the content item sequence encoding and interaction between the content item sequence encoding and the multiple modality encodings. A content item recommendation is identified by comparing each of multiple candidate content item encodings to the aggregated information encoding, determining one candidate content item encoding of the multiple candidate content item encodings having a highest probability of corresponding to a likely content item for the user to consume, and selecting a content item corresponding to the one candidate content item encoding as the content item recommendation. A recommendation for the content item corresponding to the content item recommendation is caused to be presented to the user.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Multimodal sequential recommendation with window co-attention techniques are discussed herein. Generally, a multimodal recommendation identification system analyzes data describing a sequence of past content item interactions to generate a recommendation for a content item for a user. An indication of the recommended content item is provided to a web site hosting system or a recommendation system so that the recommended content item is displayed or otherwise presented to the user.

The multimodal recommendation identification system identifies a content item to recommend to the user by generating an encoding that encodes identifiers of the sequence of content items the user has interacted with and generating encodings that encode multimodal information (e.g., images, titles, descriptions, genres, etc.) for content items in the sequence of content items the user has interacted with. A window co-attention encoder generates an aggregated information encoding for a user based on the encoding of the sequence of content items the user has interacted with and the encodings of the multimodal information, and a recommendation for the user is generated based on the aggregated information encoding. The window co-attention encoder is a machine learning system that analyzes the content item sequence encoding and interaction between the content item sequence encoding and the multiple modality encodings to generate the aggregated information encoding.

More specifically, the multimodal recommendation identification system receives content item sequence data that includes a sequence of content item identifiers that a user interacted with. A content item sequence encoding that encodes content item identifiers of the sequence of content items the user has interacted with is generated. The system also receives modality data for the content items the user has interacted with, including information for multiple different modalities. A set of multiple modality encodings that encode the multimodal information (e.g., images, titles, descriptions, etc.) for content items in the sequence of content items the user has interacted with are also generated. The set of multiple modality encodings include a different modality encoding for each different modality of information supported by the system, such as one or more of visual information, textual information, categorical information, audible information, and so forth.

It is to be noted that there is a one-to-one correspondence between content item identifiers and modality data. For example, a content item identifier at time step $t_5$ in the content item sequence data corresponds to modality data at time step $t_5$ in each of the modality encodings. Thus, rather than a content item identifier corresponding to modality data at multiple different time steps, the content item identifier corresponds to the modality data at the same time step.

The system generates an aggregated information encoding for a user based on the content item sequence encoding and the modality encodings. The aggregated information encoding is, for example, an embedding of the content item sequence encoding and the modality encodings that is usable for further prediction or recommendation as discussed in more detail below.

The aggregated information encoding is generated using a machine learning system that analyzes the content item sequence encoding and the modality encodings, as well as the interaction between the content item sequence encoding and the modality encodings, and generates attention scores for the encodings. Feature outputs for each modality in the modality encodings are generated that are aggregates of these attention scores.

The feature outputs are generated based on a sliding window masking operation that retains content item identifiers and modality information corresponding to content items within a threshold distance of the most recent content item identified in the content item sequence encoding or the content item for which a recommendation is being generated. Content item identifiers and modality information corresponding to content items not within the threshold distance are ignored in generating the feature outputs. Incorporating the sliding window masking operation allows the system to focus on a local neighborhood, improving the accuracy of the recommendation generated by introducing less noise (e.g., old data) to the feature outputs.

Attentive pooling is applied to aggregate the feature outputs. This attentive pooling is performed by applying an attention network to assign different importance to each modality in the feature outputs, resulting in modality-level attention scores. The generation of the feature outputs and aggregating of the feature outputs based on the content item sequence encoding as well as the modality encodings allows the system to analyze and identify the relationships between the content item sequence encoding and the modality encodings. For example, if a particular aspect of a content item as indicated by the modality encodings (e.g., the content item type or genre, the content item title) is tied to the user's preference, by incorporating the modality information and the interaction between the modality information and the content items the user interacts with, the system is able to make better recommendations.

The aggregated feature output is normalized to stabilize and accelerate training of the system. The system uses a feed-forward network to introduce non-linearity and interaction among different latent dimensions to the system. Modified aggregated features resulting from the feed-forward network are normalized, and the normalized output is the generated aggregated information.

The system generates a content item recommendation for a user based on the aggregated information encoding, such as a recommended webpage for the user to browse to next. The content item recommendation is generated by identifying multiple candidate content items, which vary based on implementation. Examples of candidate content items include browsable webpages, movies, books, and so forth. A candidate encoding is generated for each candidate content item in the same manner as the aggregated feature outputs are generated as discussed above.

For each candidate content item, a probability of each candidate content item being, over all possible content items, a likely content item for the user to want to consume (e.g., read, watch, listen to, etc.) next is generated. The candidate content item having a highest probability of being a likely content item for the user to consume is selected as the content item recommendation for the user. A recommendation for the content item corresponding to content item recommendation is displayed or otherwise presented to the user.

In one or more implementations, the machine learning system is trained by updating weights or values of layers in the system to minimize losses between a known next content item in a content item sequence and a content item recommendation generated by the system. Training data for each of one or more users (referred to as training users) is received, including content item sequence data as well as modality data corresponding to the content items in the content item sequence data. The training data for a training user is obtained, for example, by having the training user browse through one or more webpages of one or more websites.

The system is trained using an auto-encoding technique by masking one or more content items in the content item sequence data of the training data, obtaining a content item recommendation for each masked content item, and minimizing the loss between the known masked content item and the content item recommendation. The one or more content items to mask are selected in various manners (e.g., randomly or pseudorandomly) on the fly, for example in each epoch of training.

The techniques discussed herein improve the accuracy of content item recommendations displayed or otherwise presented to a user by taking into account the modality information regarding content items in the sequence and the interaction between the content item sequence encoding and the multiple modality encodings rather than just relying on which content items were interacted with. Furthermore, the techniques discussed herein incorporate a sliding window masking operation that allows the system to focus on a local neighborhood, improving the accuracy of the recommendation the system generates by introducing less noise (e.g., old data). This improved accuracy allows the user to be presented with items that are of interest to the user more quickly, reducing resource usage when the user is browsing through items (e.g., reduced energy usage due to more quickly identifying items, reduced bandwidth due to fewer items being transmitted to the user's device until the user identifies a desired item).

Additionally, the techniques discussed herein reuse the same trained system to generate candidate encodings for candidate content items, incorporating modality encodings into the candidate encodings to improve the accuracy of the recommendations and mitigating the cold-start problem because the system has been previously trained.

Term Descriptions

These term descriptions are provided for purposes of example only and are not intended to be construed as limiting on the scope of the claims.

The term "content item" refers to digital content. Examples of digital content include webpages, audio or video content (e.g., movies, songs), text content (e.g., articles, books), and so forth.

The term "content item identifier" refers to numbers, letters, or other characters that allow different content items to be distinguished from one another (e.g., uniquely identified) within an environment. Examples of content item identifiers include webpage uniform resource locators (URLs) or other uniform resource identifiers (URIs).

The term "content item interaction" refers to user viewing or selecting of a content item. Examples of interacting with a content item include clicking on a link to or otherwise selecting a movie, song, book, etc., watching a movie, listening to a song, and so forth.

The term "modality" of information refers to a type of information. Examples of modalities of information include textual, visual (e.g., an image or video), audible, categorical, and so forth.

The term "multimodal information" refers to multiple modalities of information.

The term "attention" refers to a machine learning system technique that emphasizes (attends) more important parts of input data and deemphasizes less important parts of input data. Which parts are more important and which parts are less important is learned through training of the machine learning system.

The term "co-attention" refers to a machine learning system technique that emphasizes (attends) more important parts of input data and deemphasizes less important parts of input data based on multimodal information. Which parts are more important and which parts are less important is learned through training of the machine learning system.

In the following discussion, an example environment is first described that employs examples of techniques described herein. Example procedures are also described which are performable in the example environment as well as other environments. Consequently, performance of the example procedures is not limited to the example environment and the example environment is not limited to performance of the example procedures.

Example Environment

Figure 1:
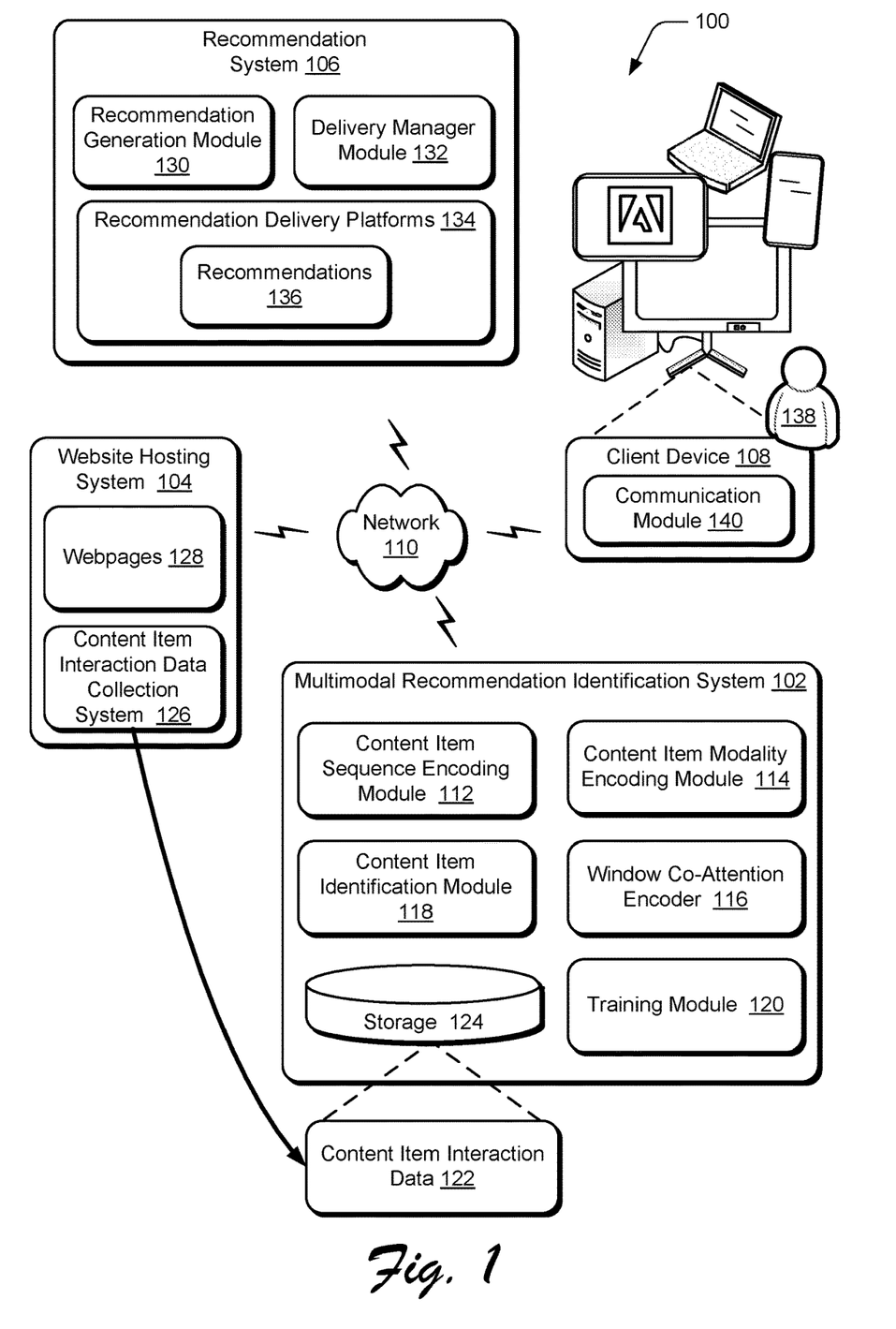
FIG. 1 is an illustration of a digital medium environment in an example implementation that is operable to employ the multimodal sequential recommendation with window co-attention described herein.

FIG. 1 is an illustration of a digital medium environment 100 in an example implementation that is operable to employ the multimodal sequential recommendation with window co-attention described herein. The illustrated digital medium environment 100 includes a multimodal recommendation identification system 102, a website hosting system 104, a recommendation system 106, and a client device 108 that are communicatively coupled, one to another, via a network 110.

Computing devices that are usable to implement the multimodal recommendation identification system 102, the website hosting system 104, the recommendation system 106, and the client device 108 are configurable in a variety of ways. Examples of a computing device, for instance, include a desktop computer, a laptop computer, a mobile device (e.g., assuming a handheld configuration such as a tablet or mobile phone), a wearable device (e.g., a watch or other jewelry, virtual reality glasses, augmented reality glasses), and so forth. Thus, computing devices range from full resource devices with substantial memory and processor resources (e.g., personal computers, game consoles) to low resource devices with limited memory and/or processing resources (e.g., mobile devices). Additionally, in one or more implementations a computing device is representative of a plurality of different devices, such as multiple servers utilized by a business to perform operations "over the cloud" as further described in relation to FIG. 5.

The multimodal recommendation identification system 102 includes a content item sequence encoding module 112, a content item modality encoding module 114, and a window co-attention encoder 116. The content item sequence encoding module 112 is representative of functionality to generate an encoding (e.g., embedding) that encodes identifiers of a sequence of content items the user has interacted with. The content item modality encoding module 114 is representative of functionality to generate encodings (e.g., embeddings) that encode multimodal information (e.g., images, titles, descriptions, genres, etc.) for content items in the sequence of content items the user has interacted with. The window co-attention encoder 116 is representative of functionality to generate an aggregated information encoding for a user based on the encoding of sequence of content items the user has interacted with and the encodings of the multimodal information. The content item identification module 118 is representative of functionality to generate a recommendation for a user based on the aggregated information encoding. The training module 120 is representative of functionality to train machine learning systems included in the multimodal recommendation identification system 102, such as content item identification module 118 and window co-attention encoder 116.

The content item sequence encoding module 112, the content item modality encoding module 114, and the window co-attention encoder 116 use various different content item interaction data 122 in a storage 124. The storage 124 is any one or more of a variety of different types of storage, such as random access memory (RAM), Flash memory, solid state drive, magnetic disk drive, and so forth. The content item interaction data 122 generally represents various data regarding content items that a user interacts with. Examples of interacting with a content item include clicking on a link to or otherwise selecting a movie, song, book, etc., watching a movie, listening to a song, reading an article, and so forth. In one or more implementations, the content item interaction data 122 includes data for interactions with content items in a current content item interaction session (e.g., a current web browsing session that begins when a web browser is opened on the client device 108 and ends when the web browser is closed). Additionally or alternatively, the content item interaction data 122 includes data for interactions with content items for multiple content item interaction sessions (e.g., multiple web browsing sessions, multiple days of watching movies or reading articles, etc.).

The content item interaction data 122 is collected by a content item interaction data collection system 126 on the website hosting system 104. The content item interaction data collection system 126 monitors and collects data regarding users' browsing behavior on the webpages 128 of the website hosting system 104, including information regarding interaction with content items on the webpages 128. This collected data is stored as content item interaction data 122 and includes, for example, identifiers of content items the user interacted with and multimodal information associated with content items the user interacted with. The content item interaction data 122 and its use are discussed in more detail below.

The recommendation system 106 includes recommendation generation module 130 and a delivery manager module 132 that implements and exposes recommendation delivery platforms 134. The recommendation delivery platforms 134 represent different mediums by which recommendations are exposed, such as websites, network-accessible applications, content streaming services, television stations, radio stations, and so forth. The recommendation delivery platforms 134 are leveraged by the delivery manager module 132 to deliver recommendations 136 generated by the recommendation generation module 130. Examples of the recommendations 136 include webpages 128, advertisements for content items, suggestions of content items to purchase or otherwise consume, and so forth.

A user 138 of the client device 108 leverages a communication module 140 to interact with a particular recommendation delivery platform 134 and to consume (e.g., read, listen to, watch, etc.) a recommendation 136. The communication module 140 generally represents functionality for presenting content on the client device 108. Examples of the communication module 140 include a web browser, a network-enabled application (e.g., an email application), a television receiver, and so on, that obtains content data from the recommendation system 106 via the network 110, and outputs the recommendation 136 via the client device 108.

According to techniques for multimodal sequential recommendation with window co-attention, the multimodal recommendation identification system 102 uses the content item interaction data 122 to generate a recommendation for a content item for a user. The generated recommendation is a recommendation for a next content item in a sequence of content items being interacted with by the user 138. In one or more implementations, an indication of the recommended content item is provided to the website hosting system 104, which provides a recommendation of the recommended content item to the user 138. For example, if the communication module 140 is a web browser that the user 138 is using to browse website hosting system 104, the website hosting system 104 displays a next webpage of webpages 128 that includes the recommended content item or displays a description of the recommended content item and link for the user 138 to select the recommended content item.

Additionally or alternatively, an indication of the recommended content item is provided to the recommendation system 106, which generates recommendations 136 based on the recommended content item, and the delivery manager module 132 manages delivery of one or more recommendations 136 to the user 138. The recommendation system 106 delivers a recommendation to the user 138 in any of a variety of different manners. For example, the recommendation delivery platform 134 sends an email to the user 138. By way of another example, when the user 138 accesses the website hosting system 104, the website hosting system 104 contacts the recommendation delivery platform 134 and provides an identifier of the user (e.g., a cookie received from the communication module 140) corresponding to the user 138 to the recommendation system 106, which then returns a recommendation to the website hosting system 104 (e.g., an advertisement) based on the user 138. The website hosting system 104 then communicates the recommendation to the client device 108 for display or other presentation to the user 138.

In one or more implementations, each user 138 has an identifier that is tracked in the digital medium environment 100. This tracking takes various forms, such as a cookie or other identifier provided by the communication module 140 to the website hosting system 104, the recommendation system 106, and so forth. The content item interaction data 122 collected by the website hosting system 104 include this identifier, allowing the multimodal recommendation identification system 102 to know which content item interaction data 122 corresponds to which user. This tracking allows the recommendation system 106 to deliver recommendations tailored to the individual users. Although a user is tracked it is to be noted that the actual identity of that user need not be tracked or known. E.g., the name of the user need not be tracked, whether the user is a human or a bot need not be tracked, whether the user is a collection of individuals (e.g., a corporate entity) need not be known, and so forth.

Although illustrated as separate systems, it is to be noted that in various situations one or more of the systems in the digital medium environment 100 are implemented as part of the same system. For example, assume the website hosting system 104 desires to display a link to a webpage of the webpages 128 that is predicted to be a next webpage that the user 138 browses to. In such situations the website hosting system 104 includes the multimodal recommendation identification system 102 that generates the recommended content item, which is the predicted next webpage in a sequence of webpages 128 that the website hosting system 104 displays. Furthermore, in such situations the digital medium environment 100 need not include the recommendation system 106.

Multimodal Recommendation Identification System Architecture

Figure 2:
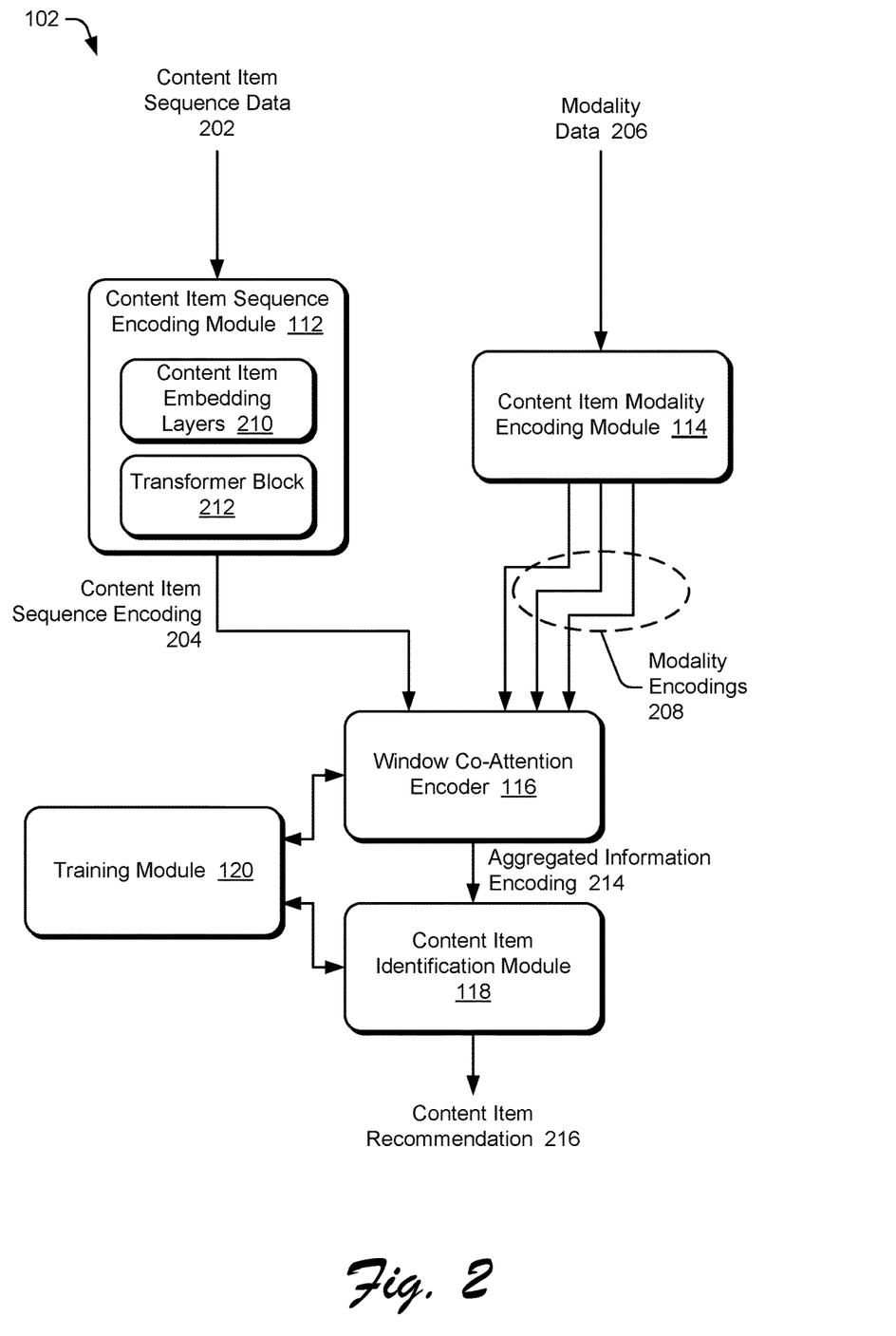
FIG. 2 is an illustration of an example architecture of a multimodal recommendation identification system.

FIG. 2 is an illustration of an example architecture of a multimodal recommendation identification system 102. The multimodal recommendation identification system 102 includes the content item sequence encoding module 112, content item modality encoding module 114, window co-attention encoder 116, content item identification module 118, and training module 120 as discussed above. In one or more implementations, the multimodal recommendation identification system 102 is a machine learning system as discussed in more detail below.

Generally, the content item sequence encoding module 112 receives content item sequence data 202, which is part of content item interaction data 122 of FIG. 1. The content item sequence encoding module 112 generates a content item sequence encoding 204 that encodes content item identifiers of a sequence of content items the user has interacted with. For example, the content item sequence encoding 204 is an embedding of a sequence of webpage identifiers of webpages that a user has browsed through. The content item modality encoding module 114 receives modality data 206, which is part of content item interaction data 122. The content item modality encoding module 114 generates a set of modality encodings 208 that encodes multimodal information (e.g., images, titles, descriptions, etc.) for content items in the sequence of content items the user has interacted with. The set of modality encodings 208 includes a separate modality encoding for each different modality supported by the multimodal recommendation identification system 102. For example, the modality encodings 208 are embeddings identifying multimodal information for each webpage in the sequence of webpages that the user has browsed through. The window co-attention encoder 116 generates an aggregated information encoding 214 for a user based on the content item sequence encoding 204 and the modality encodings 208. For example, the aggregated information encoding 214 is an embedding that aggregates the information from the content item sequence encoding 204 and the modality encodings 208. The content item identification module 118 generates a recommendation for a user based on the aggregated information encoding 214. For example, content item identification module 118 generates a recommended webpage for the user to browse to next.

More specifically, the content item sequence encoding module 112 implements functionality to generate the content item sequence encoding 204 that encodes, based on the content item sequence data 202, content item identifiers of a sequence of content items the user has interacted with. It is to be noted that the content item sequence encoding 204 is generated based on the identifiers of content items that the user interacts with rather than multimodal information for those content items. In one or more implementations, this interaction with content items is for a current content item interaction session (e.g., a current web browsing session that begins when a web browser is opened on the client device 108 and ends when the web browser is closed). Additionally or alternatively, this interaction with content items is for multiple content item interaction sessions (e.g., multiple web browsing sessions, multiple days of watching movies or reading articles, etc.).

The content item sequence encoding module 112 includes content item embedding layers 210 and a transformer block 212. The content item embedding layers 210 receive the content item sequence data 202 and generate a content item embedding for the user. The content item embedding layers 210 are randomly or pseudorandomly initialized and updated according to the content item sequence data 202.

Given a content item $i_{u(t)}$ at time step t for a user u, the content item embedding $H_t^0$ for the user u is $H_t^0 = P_t + V_{u(t)}$, where $P_t$ refers to a content item positional embedding matrix at time t and $V_{u(t)}$ refers to a content item embedding matrix at time step t for the user u. In one or more implementations, the time step t refers to a position of the user interaction with the content item in the content item sequence data 202 (e.g., a value of 0 for the first content item the user interacted with, a value of 1 for the second content item the user interacted with, a value of 2 for the third content item the user interacted with, and so forth), thereby encoding the order information for each content item embedding.

The transformer block 212 models the contextual relationship with different content items in the content item sequence data 202. The transformer block 212 receives the content item embeddings $H_t^0$ for the user from the content item embedding layers 210, and generates the content item sequence encoding 204 using multiple transformer layers each including a multi-head self-attention layer and a position-wise feed-forward network. These transformer layers are stacked, with the final transformer layer outputting a value $H^L$ as the content item sequence encoding 204.

In one or more implementations, the content item sequence encoding module 112 is implemented as an encoder as described in "BERT4Rec: Sequential recommendation with bidirectional encoder representations from transformer" by Fei Sun, Jun Liu, Jian Wu, Changhua Pei, Xiao Lin, Wenwu Ou, and Peng Jiang, In Proceedings of the 28th ACM International Conference on Information and Knowledge Management. 1441-1450 (2019), which is hereby incorporated by reference herein in its entirety.

The content item sequence encoding 204 is a content item identifier embedding that encodes the content item identifiers in the content item sequence data 202. The content item sequence encoding module 112 generates the content item sequence encoding 204 in response to various events. For example, the content item sequence encoding module 112 generates the content item sequence encoding 204 in response to the user interacting with an additional content item or interacting with a threshold number of additional content items, such as 5 or 10.

The content item modality encoding module 114 implements functionality to generate a set of modality encodings 208 that encodes multimodal information (e.g., images, titles, descriptions, etc.) for content items in the sequence of content items the user has interacted with. The set of modality encodings 208 include a different modality encoding for each different modality supported by the multimodal recommendation identification system 102.

In one or more implementations, the content item modality encoding module 114 generates a modality encoding in the set of modality encodings 208 for each of various different modalities of information associated with the content items the user interacted with, such as one or more of visual information, textual information, categorical information, audible information, and so forth. The content item modality encoding module 114 generates a modality encoding for different modalities of information in any of various public or proprietary manners depending at least in part on the modality of the information.

In one or more implementations, the content item modality encoding module 114 generates an encoding of text information by generating a vector encoding of the text information. This text information is, for example, a title of the associated content item, a description of the associated content item, a price of the associated content item, and so forth. Any of a variety of public or proprietary techniques for generating a vector encoding of text are usable by the content item modality encoding module 114. One example of such a technique is a pre-trained textual encoder, such as discussed in "Bert: Pre-training of deep bidirectional transformers for language understanding" by Jacob Devlin, Ming-Wei Chang, Kenton Lee, and Kristina Toutanova, arXiv preprint arXiv:1810.04805 (2018). Another example of such a technique is a sentence-to-vector model, such as discussed in "Unsupervised Learning of Sentence Embeddings using Compositional n-Gram Features" by Matteo Pagliardini, Prakhar Gupta, and Martin Jaggi, In NAACL 2018—Conference of the North American Chapter of the Association for Computational Linguistics (2018).

In one or more implementations, the content item modality encoding module 114 generates an encoding of visual information by generating a vector encoding that includes various features of the visual information. This visual information is, for example, a single image or a single frame of video associated with (e.g., included in) the content item. Any of a variety of public or proprietary techniques for generating a vector encoding of an image or frame of video are usable by the content item modality encoding module 114. One such technique is using a pre-trained deep learning model and linear projection, such as a ResNet model as discussed in "Deep residual learning for image recognition" by Kaiming He, Xiangyu Zhang, Shaoqing Ren, and Jian Sun, In Proceedings of the IEEE conference on computer vision and pattern recognition, 770-778 (2016).

In one or more implementations, the content item modality encoding module 114 generates an encoding of categorical information by generating a vector (e.g., a dense vector) using an embedding layer to represent each category feature associated with the content item. This categorical information is, for example, tag or category features associated with the content item (e.g., genre of a movie or book, gender of clothing) If a content item is associated with multiple categorical features, the content item modality encoding module 114 aggregates the vectors for each category feature, such as via average pooling and linear projection to generate the encoding for the categorical information.

In one or more implementations, the content item modality encoding module 114 generates an encoding of audible information by generating a vector encoding that includes various features of the audible information. This audible information is, for example, a song or music associated with (e.g., included in) the content item. Any of a variety of public or proprietary techniques for generating a vector encoding of audible information are usable by the content item modality encoding module 114. One such technique is to calculate, for each of multiple windows of the audible information (e.g., 5 second durations of the audio) a Mel Frequency Cepstral Coefficient (MFCC) that is an indication of which frequencies are present in the window.

The content item modality encoding module 114 adds positional embeddings to encode the order information for each feature $V_{u(t)}^m$ at time step t for a user u, resulting in a value of $E_t^m = P_t^m + V_{u(t)}^m$, where $P_t^m$ refers to a positional embedding matrix for modality m and $V_{u(t)}^m$ refers to a content embedding matrix for modality m at time step t for the user u. In one or more implementations, the time step t refers to a position of the user interaction with the content item associated with the different modalities of information in the modality data 206 (e.g., a value of 0 for the first content item the user interacted with, a value of 1 for the second content item the user interacted with, a value of 2 for the third content item the user interacted with, and so forth). The content item modality encoding module 114 denotes the input embeddings of modality m as $E^m = [E_1^m, E_2^m, \ldots, E_N^m]$. The content item modality encoding module 114 outputs the value of $E^m$, for each modality m, as one of the modality encodings 208.

Each of the modality encodings 208 encodes multimodal information associated with content items in the sequence that the user has interacted with. The content item modality encoding module 114 generates the modality encodings 208 in response to various events. For example, the content item modality encoding module 114 generates the modality encodings 208 in response to the user interacting with an additional content item or interacting with a threshold number of additional content items, such as 5 or 10.

It is to be noted that there is a one-to-one correspondence between content item identifiers and modality data. For example, a content item identifier at time step $t_5$ in the content item sequence data 202 corresponds to modality data at time step $t_5$ in each of the modality encodings 208. Thus, rather than a content item identifier corresponding to modality data at multiple different time steps, the content item identifier corresponds to the modality data at the same time step.

The window co-attention encoder 116 implements functionality to generate an aggregated information encoding 214 for a user based on the content item sequence encoding 204 and the modality encodings 208. The aggregated information encoding 214 is, for example, an embedding of the content item sequence encoding 204 and the modality encodings 208 that is usable for further prediction or recommendation as discussed in more detail below.

Figure 3:
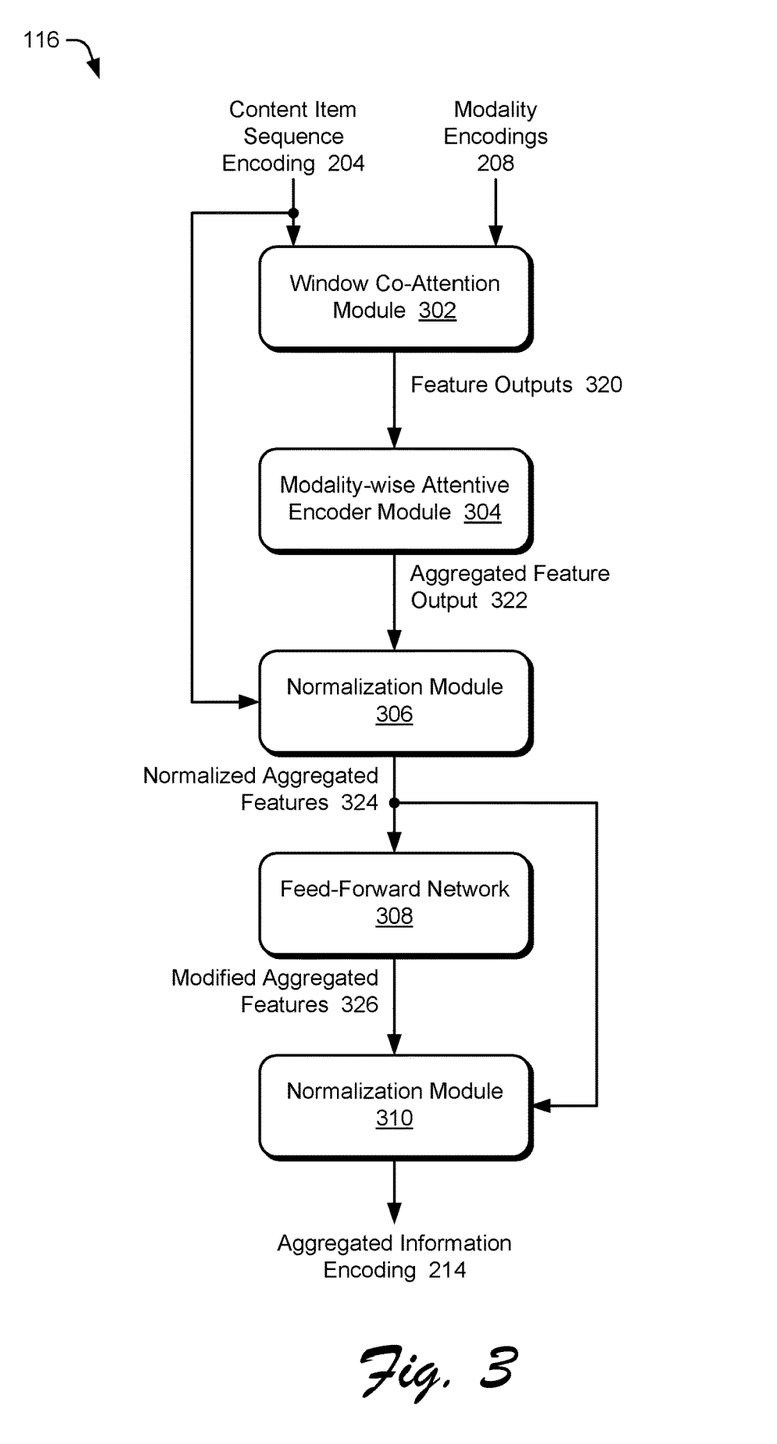
FIG. 3 is an illustration of an example architecture of a window co-attention encoder.

FIG. 3 is an illustration of an example architecture of a window co-attention encoder 116. The window co-attention encoder 116 includes a window co-attention module 302, a modality-wise attentive encoder module 304, a normalization module 306, a feed-forward network 308, and a normalization module 310.

In one or more implementations, the window co-attention encoder 116 is a machine learning system. Machine learning systems refer to a computer encoding that is tuned (e.g., trained) based on inputs to approximate unknown functions. In particular, machine learning systems are systems that utilize algorithms to learn from, and make predictions on, known data by analyzing the known data to learn to generate outputs that reflect patterns and attributes of the known data. For instance, machine learning systems include decision trees, support vector machines, linear regression, logistic regression, Bayesian networks, random forest learning, dimensionality reduction algorithms, boosting algorithms, artificial neural networks, deep learning, and so forth.

The window co-attention module 302 generates, based on the content item sequence encoding 204 and the modality encodings 208, feature outputs 320 for each modality in the modality encodings 208. The window co-attention module 302 analyzes both the content item sequence encoding 204 and all of the modality encodings in the modality encodings 208, as well as the interaction between the content item sequence encoding 204 and the modality encodings 208, to generate attention scores for the encodings, and the feature outputs 320 are aggregates of these attention scores.

In one or more implementations, the window co-attention module 302 generates the feature outputs 320 using a Softmax function. For example, a contextual content encoding $E_{att}^m$ as:

$$E_{att}^m = WCoATT_s(H^L, E^m) = \text{Softmax}\left(w_s\left(\frac{QK^T}{\sqrt{d}}\right)\right)V$$

where $Q = H^L W_Q$, $K = E^m W_K$, and $V = E^m$. The values $W_Q$ and $W_K$ are d×d projection matrices to project embeddings from different modalities into the same space for relevance calculation. The value $\sqrt{d}$ prevents large values of the relevance calculation, especially in situations when the dimensionality d is high.

The function $w_s$ acts as a sliding window masking operation. Given a square matrix $X_{d \times d}$, $w_s(X)$ retains the diagonal elements in X with window size s. Accordingly, elements $X_{ij}$ of the matrix $X_{d \times d}$ where $|i-j| \leq s$ are retained and other elements in $X_{d \times d}$ are deactivated (e.g., set to 0). The window size s is a hyperparameter that is set by applying various different window sizes (e.g., the set $\{1, 2, 4, 8, \ldots N\}$ where N is a user-selected longest sequence length) to the training data and selecting the window size that performs the best (e.g., is most accurate). Thus, content item identifiers in the content item sequence encoding 204 and modality information in the modality encodings 208 are used in determining the feature outputs 320 only if the content item identifiers and modality information correspond to content items within a threshold distance of the most recent content item identified in the content item sequence encoding 204 or the content item for which a recommendation is being generated.

Incorporating the sliding window masking operation allows window co-attention module 302 to focus on a local neighborhood ($|i-j| \leq s$). This sliding window masking operation, in contrast to a solution that does not include the sliding window masking operation, improves the accuracy of the recommendation generated by introducing less noise (e.g., old data) to the feature outputs 320.

The feature outputs 320 are the contextual content encoding $E_{att}^m$ generated for the M modalities in the modality encodings 208 as follows:

$$E_{att}^M [WCoATT_s(H^L, E^{m_1}), \ldots, WCoATT_s(H^L, E^{m|M|})]$$

The feature outputs 320 are provided to the modality-wise attentive encoder module 304, which applies attentive pooling to aggregate the feature outputs 320, generating an aggregated feature output 322. The aggregated feature output 322 represents the information aggregation from the different modalities in the modality encodings 208.

In one or more implementations, the modality-wise attentive encoder module 304 generates the aggregated feature output 322 using a Softmax function. The modality-wise attentive encoder module 304 applies an attention network to assign different importance to each modality in the feature outputs 320, generating modality-level attention scores. For example, the feature outputs 320 are denoted as $E_{att}^M = [E_{att}^{m_1}, E_{att}^{m_2}, \ldots, E_{att}^{m_{|M|}}]$ where M refers to the number of modalities in the modality encodings 208. The modality-wise attentive encoder module 304 applies an attention network AEncoder to assign different importance to each modality in $E_{att}^M$ as follows. Given a hidden encoding $E_{att_t}^M$ at time step t from $E_{att}^M$, an importance value for $E_{att_t}^M$ is determined as $AEncoder(E_{att_t}^M) = Softmax(W_A E_{att_t}^T + b_A) E_{att_t}^M$, where $W_A$ is a matrix learned during training and $b_A$ is a scalar bias term that is learned during training.

The modality-wise attentive encoder module 304 generates, as the aggregated feature output 322, a value MAEncoder as follows:

$$MAEncoder(E_{att}^M) = [AEncoder(E_{att_1}^M), \ldots, AEncoder(E_{att_N}^M)]$$

where N refers to the number of time stamps for which a hidden encoding $E_{att_t}^M$ is included in each modality in $E_{att}^M$.

The use of Softmax functions by window co-attention module 302 and modality-wise attentive encoder module 304 based on the content item sequence encoding 204 as well as the modality encodings 208 allows the window co-attention module 302 and modality-wise attentive encoder module 304 to analyze and identify the relationships between the content item sequence encoding 204 and the modality encodings 208. For example, if a particular aspect of a content item as indicated by the modality encodings 208 (e.g., the content item type or genre, the content item title) is tied to the user's preference, by incorporating the modality information and the interaction between the modality information and the content items the user interacts with, the window co-attention module 302 and modality-wise attentive encoder module 304 are able to provide window co-attention encoder 116 with the ability to make better recommendations.

The aggregated feature output 322 and content item sequence encoding 204 are provided to normalization module 306, which is a normalization layer that stabilizes the window co-attention encoder 116 and accelerates training of the window co-attention encoder 116. In one or more implementations, the normalization module 306 generates normalized aggregated features 324 $H_{att}$ as $H_{att}^M = LayerNorm(H^L + MAEncoder(E_{att}^M))$.

The feed-forward network 308 receives the normalized aggregated features 324. The window co-attention module 302 and modality-wise attentive encoder module 304 aggregate content item interactions and multimodal information with linear projections. The feed-forward network 308 introduces non-linearity and interactions among different latent dimensions to the window co-attention encoder 116.

In one or more implementations, the feed-forward network 308 is a point-wise feed-forward network that generates a value $PFFN(H_{att}^M)$ modified aggregated features 326 as $PFFN(H_{att}^M) = [FFN(H_{att_1}^M), \ldots, FFN(H_{att_N}^M)]$, where N refers to the number of time stamps t for which a hidden encoding $H_{att_t}^M$ is included in each modality in $H_{att}^M$. Here, $FFN(H_{att_t}^M)$ is defined as $FFN(H_{att_t}^M) = GELU((H_{att_t}^M W^{(1)} + b^{(1)}) W^{(2)} + b^{(2)})$, where $W^{(1)}$ and $W^{(2)}$ are learned during training and $b^{(1)}$ and $b^{(2)}$ are bias terms that are learned during training. The weights of $FFN(H_{att_t}^M)$ are shared in different positions with no interaction between different encodings for different time stamps (e.g., no interaction between $H_{att_t}^M$ and $H_{att_{t+1}}^M$. Although the Gaussian Error Linear Unit (GELU) is discussed as being used by the feed-forward network 308, additionally or alternatively other activation functions are used, such as a Rectified Linear Unit (ReLU).

The modified aggregated features 326 and the normalized aggregated features 324 are provided to normalization module 310, which is a normalization layer that stabilizes the window co-attention encoder 116 and accelerates training of the window co-attention encoder 116. In one or more implementations, the normalization module 310 generates aggregated information encoding 214 $H_{out}^M$ as:

$$H_{out}^M = LayerNorm(H_{att}^M + Dropout(PFFN(H_{att}^M)))$$

where Dropout represents a dropout layer that ignores or drops out some outputs from the feed-forward network 308 to avoid overfitting the window co-attention encoder 116. The aggregated information encoding 214 $H_{out}^M$ is the output embedding aggregating information from content item sequences and other multimodal content sequences with content item identifier to multimodal content sequence interactions, which is usable for further prediction.

Returning to FIG. 2, the content item identification module 118 generates a content item recommendation 216 for a user based on the aggregated information encoding 214. For example, content item identification module 118 generates a recommended webpage for the user to browse to next. The content item identification module 118 generates the content item recommendation 216 by identifying multiple candidate content items, which vary based on implementation. Examples of candidate content items include browsable webpages, movies, books, and so forth.

In one or more implementations, the content item identification module 118 generates a set of candidate encodings including a candidate encoding for each candidate content item E as $E = V + MAEncoder(V^M)$, where $V^M = [V^{m_1}, \ldots, V^{m_{|M|}}]$, $V^m$ refers to the content embedding matrix for modality m, M refers to the number of modalities in the modality encodings 208, and V refers to the content item embedding matrix for the content item. The MAEncoder in content item identification module 118 is the same as in modality-wise attentive encoder module 304. This mitigates the cold-start problem because the MAEncoder, e.g., because has been previously trained. The value generated by the MAEncoder is combined with the content item embedding matrix V in any of various manners, such as by generating an element-wise sum.

The content item identification module 118 predicts the probability of each candidate content item being, over all possible content items, a likely content item for the user to want to consume (e.g., read, watch, listen to, etc.) next. In one or more implementations, this probability P(i) is generated as $P(i) = Softmax_i(EH_{out_t}^{M^T} + b_o)$, where $b_o$ is a global bias term for content items that is learned during training, and $Softmax_i$ denotes the $i^{th}$ probability from the Softmax layer. The content item identification module 118 selects the candidate content item having a highest probability of being a likely content item for the user to consume as the content item recommendation 216. Thus, in determining the content item recommendation 216, the content item identification module 118 factors in the various modality information for the candidate content items rather than relying on just the content item identifiers for the candidate content items. Incorporating this modality information allows the content item identification module 118 to better identify likely content items for the user to consume, leading to a more accurate content item recommendation 216.

The content item identification module 118 causes a recommendation for the content item corresponding to content item recommendation 216 to be displayed or otherwise presented to the user, such as by communicating the content item recommendation 216 to the recommendation system 106. In response to receipt of the content item recommendation 216, the recommendation system 106 generates recommendations 136 based on the content item recommendation 216 as discussed above.

In one or more implementations, multimodal recommendation identification system 102 includes a training module 120 as illustrated in FIG. 2. The training module 120 is optional and is usable to initially train the multimodal recommendation identification system 102 (e.g., the window co-attention encoder 116 and the content item identification module 118, and in some situations the content item sequence encoding module 112 and the content item modality encoding module 114). Additionally or alternatively, the window co-attention encoder 116 and content item identification module 118 are trained by another device or system and included in the multimodal recommendation identification system 102. The training module 120 is also usable to further train the multimodal recommendation identification system 102 as a user is browsing webpages. The training module 120 trains the multimodal recommendation identification system 102, training the feature window co-attention encoder 116 and content item identification module 118 together, end-to-end. The multimodal recommendation identification system 102 is trained, for example, by updating weights or values of layers in the window co-attention encoder 116 and content item identification module 118 to minimize losses between a known next content item in a content item sequence and a content item recommendation 216.

The training module 120 receives training data used to train the multimodal recommendation identification system 102, the training data being, for each of one or more users (referred to as training users), content item sequence data 202 as well as the modality data 206 corresponding to the content items in the content item sequence data 202. The training data is for a training user is obtained, for example, by having the training user browse through one or more webpages of one or more websites.

The training module 120 trains the multimodal recommendation identification system 102 using an auto-encoding technique by masking one or more content items in the content item sequence data 202 of the training data, obtaining a content item recommendation 216 for each masked content item, and minimizing the loss between the known masked content item and the content item recommendation 216. The one or more content items to mask are selected in various manners (e.g., randomly or pseudorandomly) on the fly, for example in each epoch of training.

The training module 120 uses any of a variety of different loss functions. In one or more implementations, the training module 120 uses the negative log-likelihood of the masked targets $\mathcal{L}$ as follows:

$$\mathcal{L} = -\frac{1}{|s_u^{mask}|} \sum_{\bar{i} \in s_u^{mask}} \log P(\bar{i} = i \mid s_u')$$

where $s_u'$ refers to a masked input from the content item sequence data $s_u$ for user u, $s_u^{mask}$ refers to the set of masked content items in the content item sequence data $s_u$, and $\bar{t}$ refers to the target content item for $\bar{i}$.

At the beginning of training, the updating weights or values of layers of the window co-attention encoder 116 and the content item identification module 118 are initialized to random or approximately random (e.g., pseudorandom) numbers. These weights or values are then updated during training to minimize the loss between the known masked content item and the content item recommendation 216. In one or more implementations, the training is terminated when the loss converges to a near zero constant value. Additionally or alternatively, the training terminates in response to other events, such as a threshold time duration expiring, a threshold amount training data having been used for training, and so forth.

In one or more implementations, the training module 120 continues training the multimodal recommendation identification system 102 during use. For example, as additional content item interaction data 122 is obtained, the training module 120 further trains the multimodal recommendation identification system 102 in the same manner as discussed above. Optionally, different content item interaction data 122 is maintained for different users and used to train different multimodal recommendation identification systems 102, allowing each such multimodal recommendation identification system 102 to be trained for a specific user (or group of users).

Example Procedures

The following discussion describes techniques that are implemented utilizing the previously described systems and devices. Aspects of the procedure are implemented in hardware, firmware, software, or a combination thereof. The procedure is shown as a set of blocks that specify operations performed by one or more devices and are not necessarily limited to the orders shown for performing the operations by the respective blocks. Furthermore, although various operations performed by one or more devices are recited, the techniques discussed herein additionally or alternatively include additional operations. In portions of the following discussion, reference is made to FIGS. 1-3.

Figure 4:
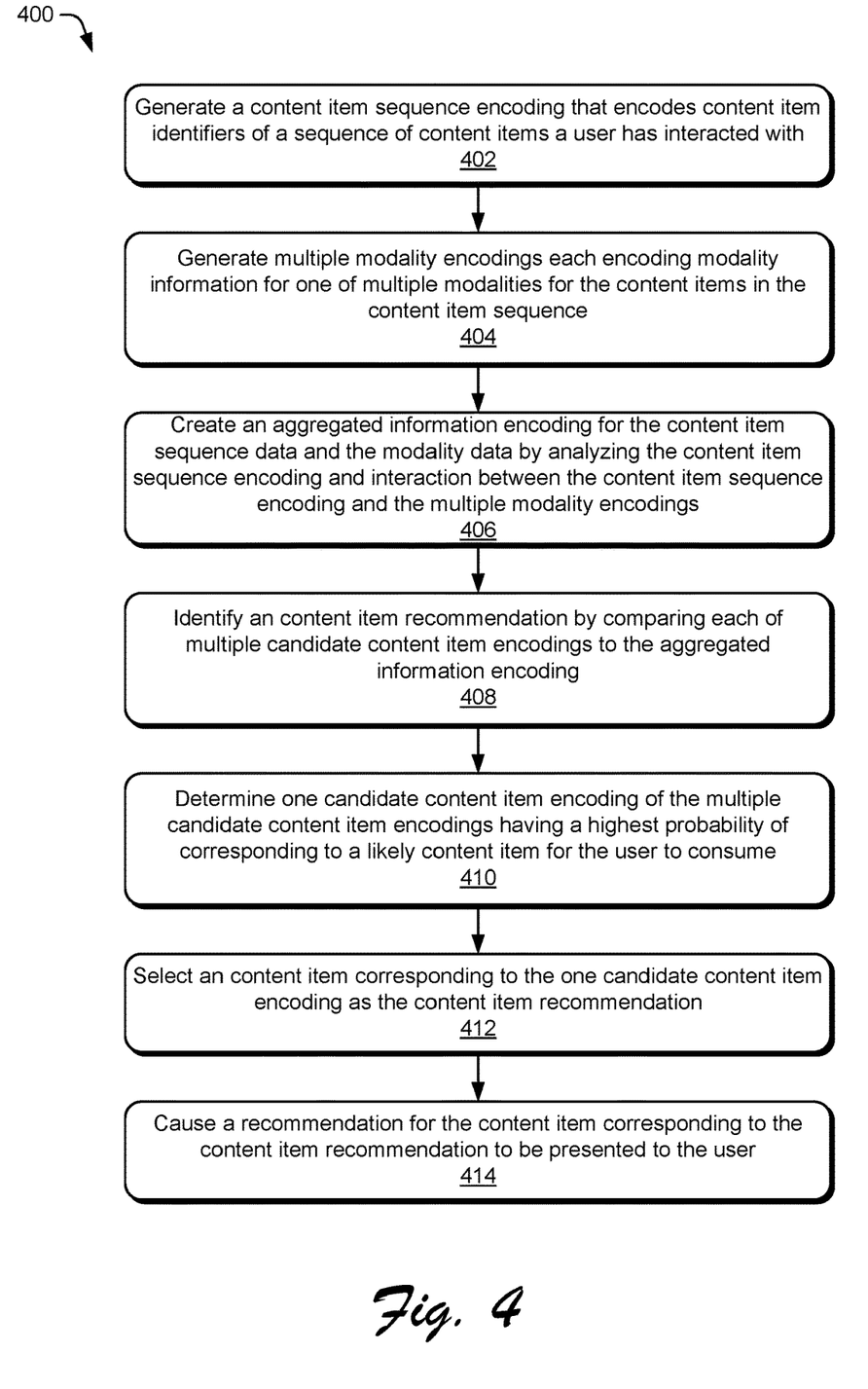
FIG. 4 is a flow diagram depicting a procedure in an example implementation of multimodal sequential recommendation with window co-attention.

FIG. 4 is a flow diagram 400 depicting a procedure in an example implementation of multimodal sequential recommendation with window co-attention. In this example, a content item sequence encoding that encodes content item identifiers of a sequence of content items a user has interacted with is generated (block 402). These content items are, for example, content items the user interacted with during a current web browsing session or across multiple web browsing sessions.

Multiple modality encodings are generated (block 404). Each modality encoding encodes modality information for one of multiple modalities for the content items in the content item sequence.

An aggregated information encoding for the content item sequence data and the modality data is created (block 406). In one or more implementations, the aggregated information encoding is created by a machine learning system analyzing the content item sequence encoding and interaction between the content item sequence encoding and the multiple modality encodings.

A content item recommendation is identified by comparing each of multiple candidate content item encodings to the aggregated information encoding (block 408).

One candidate content item encoding of the multiple candidate content item encodings having a highest probability of corresponding to a likely content item for the user to consume is determined (block 410).

A content item corresponding to the one candidate content item encoding is selected as the content item recommendation (block 412).

A recommendation for the content item corresponding to the content item recommendation is caused to be displayed or otherwise presented to the user (block 414).

Example System and Device

Figure 5:
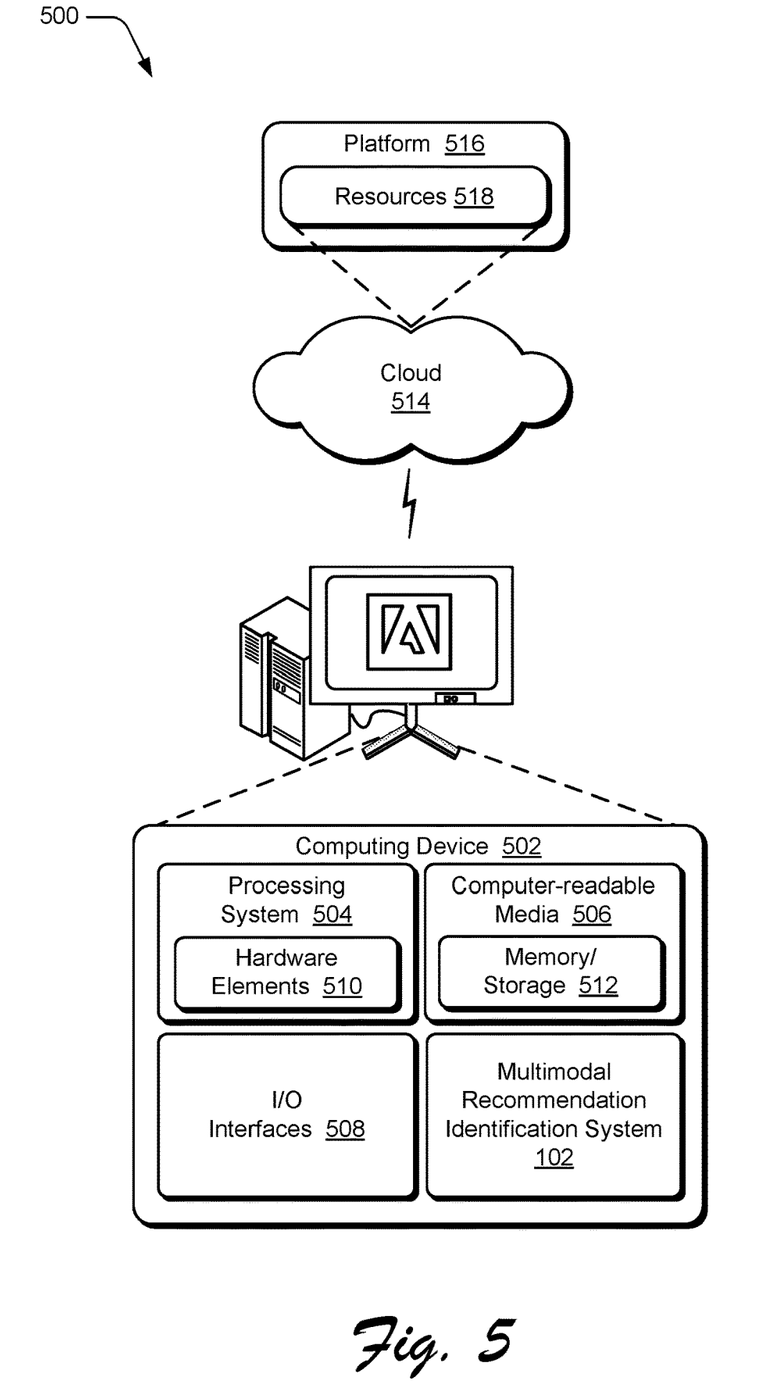
FIG. 5 illustrates an example system including various components of an example device that is implemented as any type of computing device as described and/or utilized with reference to FIGS. 1-4 to implement aspects of the techniques described herein.

FIG. 5 illustrates an example system generally at 500 that includes an example computing device 502 that is representative of one or more computing systems and/or devices that implement the various techniques described herein. This is illustrated through inclusion of the multimodal recommendation identification system 102. The computing device 502 is, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O interface 508 that are communicatively coupled, one to another. Although not shown, in one or more implementations the computing device 502 further includes a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware element 510 that are configured, for example, as processors, functional blocks, and so forth. The processing system 504 is optionally implemented in hardware as an application specific integrated circuit or other logic device formed using one or more semiconductors. The hardware elements 510 are not limited by the materials from which they are formed, or the processing mechanisms employed therein. For example, in one or more implementations processors are comprised of semiconductor(s) and/or transistors (e.g., electronic integrated circuits (ICs)). In such a context, processor-executable instructions include electronically-executable instructions.

The computer-readable storage media 506 is illustrated as including memory/storage 512. The memory/storage 512 represents memory/storage capacity associated with one or more computer-readable media. The memory/storage component 512 represents memory/storage capacity associated with one or more computer-readable media. The memory/storage component 512 includes one or both of volatile media (such as random access memory (RAM)) and non-volatile media (such as read only memory (ROM), Flash memory, optical disks, magnetic disks, and so forth). The memory/storage component 512 includes one or both of fixed media (e.g., RAM, ROM, a fixed hard drive, and so on) and removable media (e.g., Flash memory, a removable hard drive, an optical disc, and so forth). The computer-readable media 506 is optionally configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 502 is configured in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

An implementation of the described modules and techniques is optionally stored on or transmitted across some form of computer-readable media. The computer-readable media includes any of a variety of media that is accessible by the computing device 502. By way of example, and not limitation, computer-readable media includes "computer-readable storage media" and "computer-readable signal media."

"Computer-readable storage media" refers to media and/or devices that enable persistent and/or non-transitory storage of information thereon in contrast to mere signal transmission, carrier waves, or signals per se. Computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which is accessed by a computer.

"Computer-readable signal media" refers to a signal-bearing medium that is configured to transmit instructions to the hardware of the computing device 502, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of modules, programmable device logic and/or fixed device logic implemented in a hardware form that are employed in some implementations to implement at least some aspects of the techniques described herein, such as to perform one or more instructions. Hardware includes, for example, components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are optionally employed to implement various techniques described herein. Accordingly, in one or more implementations software, hardware, or executable modules are implemented as one or more instructions and/or logic embodied on some form of computer-readable storage media and/or by one or more hardware elements 510. The computing device 502 is configured to implement particular instructions and/or functions corresponding to the software and/or hardware modules. Accordingly, implementation of a module that is executable by the computing device 502 as software is achievable at least partially in hardware, e.g., through use of computer-readable storage media and/or hardware elements 510 of the processing system 504. The instructions and/or functions executable/operable by one or more articles of manufacture (for example, one or more computing devices 502 and/or processing systems 504) to implement techniques, modules, and examples described herein.

The techniques described herein are supported by various configurations of the computing device 502 and are not limited to the specific examples of the techniques described herein. Additionally or alternatively, this functionality is implemented all or in part through use of a distributed system, such as over a "cloud" 514 via a platform 516 as described below.

The cloud 514 includes and/or is representative of a platform 516 for resources 518. The platform 516 abstracts underlying functionality of hardware (e.g., servers) and software resources of the cloud 514. The resources 518 include applications and/or data utilizable while computer processing is executed on servers that are remote from the computing device 502. Resources 518 optionally include services provided over the Internet and/or through a subscriber network, such as a cellular or Wi-Fi network.

The platform 516 abstract resources and functions to connect the computing device 502 with other computing devices. The platform 516 also optionally serves to abstract scaling of resources to provide a corresponding level of scale to encountered demand for the resources 518 that are implemented via the platform 516. Accordingly, in an interconnected device embodiment, implementation of functionality described herein is distributed throughout the system 500. For example, the functionality is implemented in part on the computing device 502 as well as via the platform 516 that abstracts the functionality of the cloud 514.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment, a method implemented by at least one computing device, the method comprising:
   generating, by a content item sequence encoding module, a content item sequence encoding for each content item in a content item sequence that encodes content item identifiers of a sequence of content items a user has interacted with, the content item identifier allowing different content items in the content item sequence to be distinguished from one another;
   generating, by a content item modality encoding module, multiple modality encodings each encoding modality information for each one of multiple modalities corresponding to the different content items in the content item sequence;
   generating modality-level attention scores by applying an attention network to assign an importance to each of the one of multiple modalities;
   creating, by a window co-attention encoder, an aggregated information encoding for the sequence of content items and the modality information by a machine learning system analyzing the content item sequence encoding and interaction between the content item sequence encoding and the multiple modality encodings based on the modality-level attention scores;
   identifying, by a content item identification module, a content item recommendation by comparing each of multiple candidate content item encodings to the aggregated information encoding;
   determining, by the content item identification module, one candidate content item encoding of the multiple candidate content item encodings having a highest probability of corresponding to a likely content item for the user to consume;
   selecting, by the content item identification module, a content item corresponding to the one candidate content item encoding as the content item recommendation; and
   causing, by the content item identification module, a recommendation for the content item corresponding to the content item recommendation to be presented to the user.

2. The method as recited in claim 1, the creating including:
   generating, by a window co-attention module, feature outputs for each content item in the content item sequence, by the machine learning system analyzing the content item sequence encoding and interaction between the content item sequence encoding and the multiple modality encodings;
   generating, by a modality-wise attentive encoder module, an aggregated feature output by aggregating the feature outputs;
   generating, by a first normalization module, normalized aggregated features by normalizing the aggregated feature output based on the content item sequence encoding;
   generating, by a feed-forward network, modified aggregated features by introducing non-linearity to the normalized aggregated features; and generating, by a second normalization module, the aggregated information encoding by normalizing the modified aggregated features based on the normalized aggregated features.

3. The method as recited in claim 2, the identifying the content item recommendation further including generating, by the modality-wise attentive encoder module and for each candidate content item of the multiple candidate content items, a corresponding candidate encoding based on a content item encoding of the content item identifier of the candidate content item and modality encodings of the multiple modalities for the content item.

4. The method as recited in claim 2, further comprising applying, in generating the feature outputs, a sliding window masking operation so that the feature outputs for each content item in the content item sequence are generated by analyzing the content item sequence encoding and interaction between the content item sequence encoding and the multiple modality encodings only for other content items in the content item sequence encoding within a threshold distance of the content item.

5. The method as recited in claim 4, further comprising generating the feature outputs by ignoring one or more content items in the content item sequence encoding that are not within the threshold distance of the content item.

6. The method as recited in claim 1, the creating including, for each content item in the content item sequence, maintaining a one-to-one correspondence between the content item encoding for the content item and each of the multiple modalities corresponding to the content item.

7. The method as recited in claim 1, the multiple modalities including multiple of textual, visual, audible, and categorical.

8. The method as recited in claim 1, further comprising terminating presentation of the recommendation to the user in response to an event.

9. The method as recited in claim 1, wherein the content item modality encoding module generates an encoding of text information by generating a vector encoding of the text information.

10. The method as recited in claim 1, wherein the content item modality encoding module generates an encoding of visual information by generating a vector encoding of the visual information.

11. In a digital medium environment, a computing device comprising:
a processor; and
computer-readable storage media having stored thereon multiple instructions of an application that, responsive to execution by the processor, cause the processor to perform operations including:
generating a content item sequence encoding for each content item in a content item sequence that encodes content item identifiers of a sequence of content items a user has interacted with, the content item identifier allowing different content items in the content item sequence to be distinguished from one another;
generating multiple modality encodings each encoding modality information for each one of multiple modalities corresponding to the different content items in the content item sequence;
generating modality-level attention scores by applying an attention network to assign an importance to each of the one of multiple modalities;
creating an aggregated information encoding for the sequence of content items and the modality information by a machine learning system analyzing the content item sequence encoding and interaction between the content item sequence encoding and the multiple modality encodings based on the modality-level attention scores;
identifying a content item recommendation by comparing each of multiple candidate content item encodings to the aggregated information encoding;
determining one candidate content item encoding of the multiple candidate content item encodings having a highest probability of corresponding to a likely content item for the user to consume;
selecting a content item corresponding to the one candidate content item encoding as the content item recommendation; and
causing a recommendation for the content item corresponding to the content item recommendation to be presented to the user.

12. The computing device as recited in claim 11, the creating including:
generating, by a window co-attention module, feature outputs for each content item in the content item sequence, by the machine learning system analyzing the content item sequence encoding and interaction between the content item sequence encoding and the multiple modality encodings;
generating, by a modality-wise attentive encoder module, an aggregated feature output by aggregating the feature outputs;
generating, by a first normalization module, normalized aggregated features by normalizing the aggregated feature output based on the content item sequence encoding;
generating, by a feed-forward network, modified aggregated features by introducing non-linearity to the normalized aggregated features; and
generating, by a second normalization module, the aggregated information encoding by normalizing the modified aggregated features based on the normalized aggregated features.

13. The computing device as recited in claim 12, the identifying the content item recommendation further including generating, by the modality-wise attentive encoder module and for each candidate content item of the multiple candidate content items, a corresponding candidate encoding based on a content item encoding of the content item identifier of the candidate content item and modality encodings of the multiple modalities for the content item.

14. The computing device as recited in claim 12, the operations further comprising applying, in generating the feature outputs, a sliding window masking operation so that the feature outputs for each content item in the content item sequence are generated by analyzing the content item sequence encoding and interaction between the content item sequence encoding and the multiple modality encodings only for other content items in the content item sequence encoding within a threshold distance of the content item.

15. The computing device as recited in claim 14, the operations further comprising generating the feature outputs by ignoring one or more content items in the content item sequence encoding that are not within the threshold distance of the content item.

16. The computing device as recited in claim 11, the creating including, for each content item in the content item sequence, maintaining a one-to-one correspondence between the content item encoding for the content item and each of the multiple modalities corresponding to the content item.

17. The computing device as recited in claim 16, the multiple modalities including multiple of textual, visual, audible, and categorical.

18. A system comprising:
a memory component; and
a processing device executing instructions stored in the memory component, the processing device to perform operations comprising:
generating a content item sequence encoding for each content item in a content item sequence that encodes content item identifiers of a sequence of content items a user has interacted with, the content item identifier allowing different content items in the content item sequence to be distinguished from one another;
generating multiple modality encodings each encoding modality information for each one of multiple modalities corresponding to the different content items in the content item sequence;
generating modality-level attention scores by applying an attention network to assign an importance to each of the one of multiple modalities;
creating an aggregated information encoding for the sequence of content items and the modality information based on the content item sequence encoding and interaction between the content item sequence encoding and the multiple modality encodings based on the modality-level attention scores; and
identifying a content item recommendation based on multiple candidate content item encodings and causing a recommendation for the content item corresponding to the content item recommendation to be presented to the user.

19. The system in claim 18, wherein creating the aggregated information encoding includes applying a sliding window masking operation so that data for each content item in the content item sequence and the multiple modality encodings are analyzed only for other content items in the content item sequence encoding within a threshold distance of the content item.

20. The system in claim 18, the multiple modalities including multiple of textual, visual, audible, and categorical.

* * * * *